US011347409B1

(12) United States Patent
Randolph et al.

(10) Patent No.: US 11,347,409 B1
(45) Date of Patent: May 31, 2022

(54) METHOD AND APPARATUS FOR SELECTIVE COMPRESSION OF DATA DURING INITIAL SYNCHRONIZATION OF MIRRORED STORAGE RESOURCES

(71) Applicant: EMC IP HOLDING COMPANY LLC, Hopkinton, MA (US)

(72) Inventors: Benjamin Randolph, Uxbridge, MA (US); Rong Yu, West Roxbury, MA (US); Malak Alshawabkeh, Franklin, MA (US); Ian Adams, Cambridge, MA (US)

(73) Assignee: Dell Products, L.P., Hopkinton, MA (US)

( * ) Notice: Subject to any disclaimer, the term of this patent is extended or adjusted under 35 U.S.C. 154(b) by 46 days.

(21) Appl. No.: 17/146,805

(22) Filed: Jan. 12, 2021

(51) Int. Cl.
*G06F 12/00* (2006.01)
*G06F 3/06* (2006.01)
*G06F 11/14* (2006.01)

(52) U.S. Cl.
CPC .......... *G06F 3/0619* (2013.01); *G06F 3/067* (2013.01); *G06F 3/0653* (2013.01); *G06F 3/0659* (2013.01); *G06F 11/1451* (2013.01); *G06F 11/1469* (2013.01)

(58) Field of Classification Search
CPC ..................................... G06F 3/065
See application file for complete search history.

(56) References Cited

U.S. PATENT DOCUMENTS

| 2014/0237201 A1* | 8/2014 | Swift | H04L 67/1095 |
| | | | 711/162 |
| 2018/0088807 A1* | 3/2018 | Zhao | G06F 3/0644 |
| 2021/0011637 A1* | 1/2021 | Shah | G06F 21/6245 |

* cited by examiner

*Primary Examiner* — Daniel D Tsui
(74) *Attorney, Agent, or Firm* — Anderson Gorecki LLP

(57) ABSTRACT

A primary storage system appends a red-hot data indicator to each track of data transmitted on a remote data facility during an initial synchronization state. The red-hot data indicator indicates, on a track-by-track basis, whether the data associated with that track should be stored as compressed or uncompressed data by the backup storage system. The red-hot data indicator may be obtained from the primary storage system's extent-based red-hot data map. If the red-hot data indicator indicates that the track should remain uncompressed, or if the track is locally identified as red-hot data, the backup storage system stores the track as uncompressed data. If the red-hot data indicator indicates that the track should be compressed, the backup storage system compresses the track and stores the track as compressed data. After the initial synchronization process has completed, red-hot data indicators are no longer appended to tracks by the primary storage system.

20 Claims, 4 Drawing Sheets

METHOD AND APPARATUS FOR SELECTIVE COMPRESSION OF DATA DURING INITIAL SYNCHRONIZATION OF MIRRORED STORAGE RESOURCES

FIELD

This disclosure relates to computing systems and related devices and methods, and, more particularly, to a method and apparatus for selective compression of data during initial synchronization of mirrored storage resources.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

When a remote data facility is created between a primary storage system and backup storage system, the pair of storage systems will enter into an initial synchronization state. During this initial synchronization, the primary storage system will transmit all tracks of data associated with a group of storage volumes designed as being protected by the remote data facility. A red-hot data indicator is added by the primary storage system to each track of data transmitted on the remote data facility during this initial synchronization state. The red-hot data indicator indicates to the backup storage system, on a track-by-track basis, whether the data associated with that track should be stored in uncompressed form or compressed form on the backup storage system.

During the initial synchronization phase, when the backup storage system R2 receives a track on the remote data facility, it checks the red-hot data indicator associated with the track. If the red-hot data indicator indicates that the track should remain uncompressed, the backup storage system does not compress the track and stores the track in storage resources in an uncompressed form. If the red-hot data indicator indicates that the track should be compressed, the backup storage system checks to see if it previously had the track marked as uncompressed. If the backup storage system did not previously have the track marked as uncompressed, the backup storage system passes the track to a compression engine and stores the track in storage resources in a compressed form. If the backup storage system previously had the track marked as uncompressed, the backup storage system does not compress the track.

After the initial synchronization process has completed, the primary and backup storage systems exit the initial synchronization state and enter a data maintenance state. During the data maintenance state, the primary storage system transmits changes to the storage volumes and periodically transmits its red-hot data map to the backup storage system. The red-hot data map indicates, on an extent-by-extent basis, which extents of data should be stored in compressed form on the backup storage system. Upon receipt of the red-hot data map, the backup storage system will move extents of data between compressed and uncompressed storage, as necessary, to synchronize the manner in which extents of data are stored on the backup storage system with the manner in which the extents of data are stored on the primary storage system.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
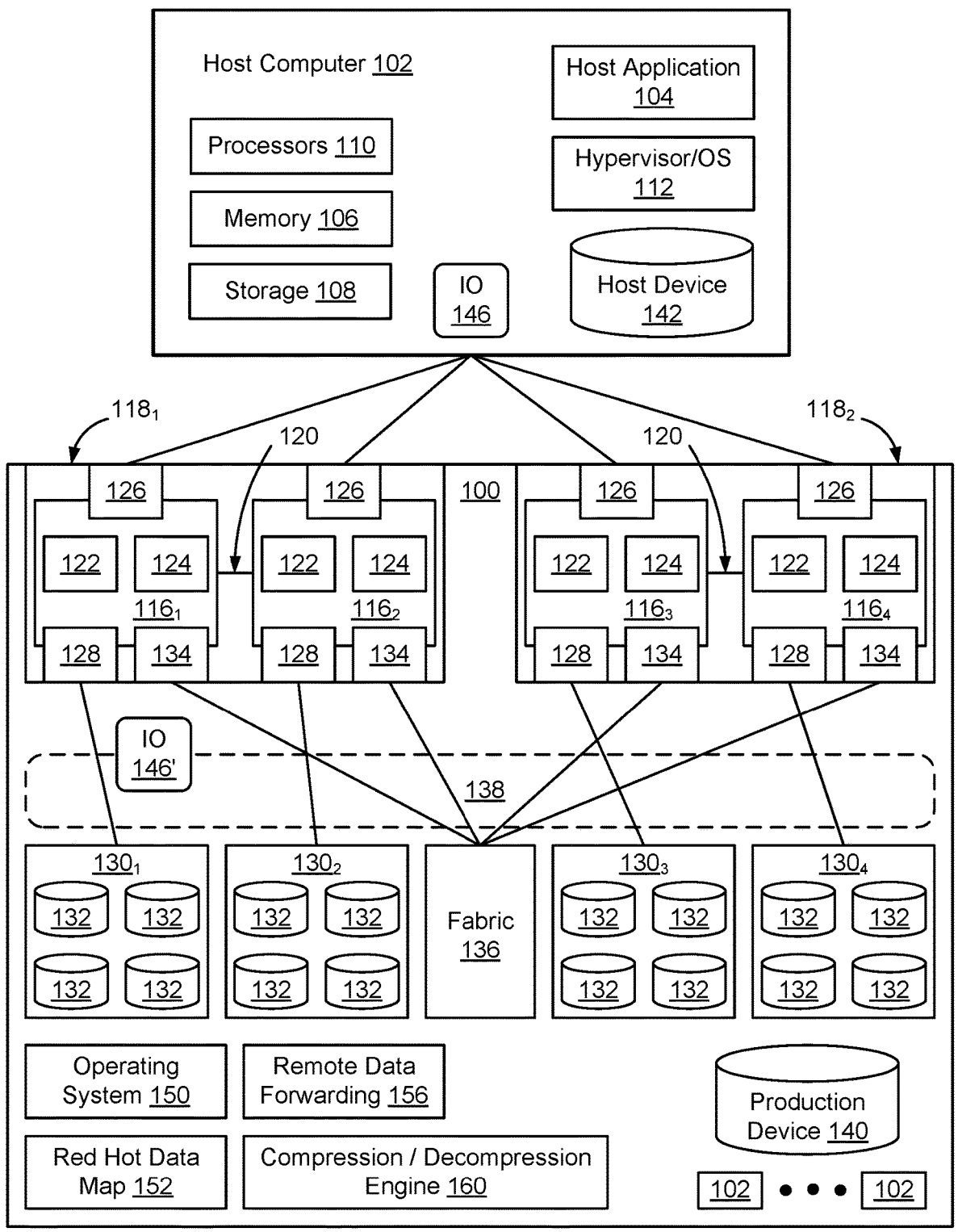
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location on which the block is written on the managed drives 132. The virtual shared global memory 138 may enable the production device 140 to be reachable via all of the compute nodes $116_1$-$116_4$ and paths, although the storage system 100 can be configured to limit use of certain paths to certain production devices 140.

In some embodiments, the storage system 100 has a compression/decompression engine 160 which is a hardware implemented set of components that are configured to implement a compression process on tracks of data received from a host 102 in connection with write operations prior to storing the data in managed drives 132. The compression/decompression engine 160 is also configured to implement a decompression process on tracks of data prior to providing the tracks of data in response to a read request from host computer 102.

In some embodiments, the primary storage system R1 allocates fixed size blocks of physical storage to be used to store data by the host applications 104. These fixed size blocks of physical storage resources are referred to herein as "extents". An extent, is the minimum granularity of storage size that is allocated by the storage system to a host application 104. An example extent size might be, for example twelve 64 KB tracks (768 KB) of physical disk space, although other extent sizes may be used as well.

As read and write operations occur on the storage volumes, the primary storage system R1 monitors those IO operations on a per-extent basis, and maintains a red-hot data map 152 identifying which extents are experiencing high IO activity and which extents are experiencing lower IO activity.

To increase the storage system's overall response rate, the storage system 100 may treat data identified as red-hot as special. For example, the storage system 100 may maintain a portion of a host's data identified as red-hot data in uncompressed form. This makes retrieval of the data associated with the hot extents faster, since the data does not need to be processed by the compression/decompression engine 160 prior to being provided to the host 102. The other data that is not identified as red-hot, by contrast, can be compressed prior to being stored in managed drives 132 to reduce the amount of storage resources required to maintain that portion of the host's data. In some embodiments, the storage system may maintain 20% of a host's data in uncompressed form and compress the remaining 80%, although the particular ratio of compressed vs uncompressed data may vary depending on the implementation and user preferences. In some embodiments, the storage system 100 periodically moves extents of data between the compressed data pool and the uncompressed data pool based on which extents have recently been experiencing high Input/Output (IO) activity.

To provide enhanced reliability, host data that is stored on a primary storage system R1 may be mirrored to a backup storage system R2, for example located at a remote location on a communication network. By having the data mirrored from the primary storage system R1 to the backup storage system R2, if a failure occurs which impedes the host's ability to access the data on the primary storage system R1, the host can continue to access the data on the backup storage system R2.

Accordingly, storage systems have developed the ability for a primary storage system R1 to perform data replication to a backup storage system R2, where the storage systems are compatible and properly configured. A Remote Data Forwarding (RDF) application 156, when executed on the primary storage system R1, enables the storage system to participate in track level data replication between sets of mirroring pairs of storage systems 120. A set of storage systems that are configured for data to be mirrored from a primary storage system R1 to a backup storage system R2 will be referred to herein as a "Remote Data Facility". A given storage system may operate as a primary storage system R1 or backup storage system R2 in many mirroring pairs, and hence multiple instances of RDF application 156 may simultaneously execute on storage system 100 to control participation of the storage system 100 on remote data facilities 200.

Figure 2:
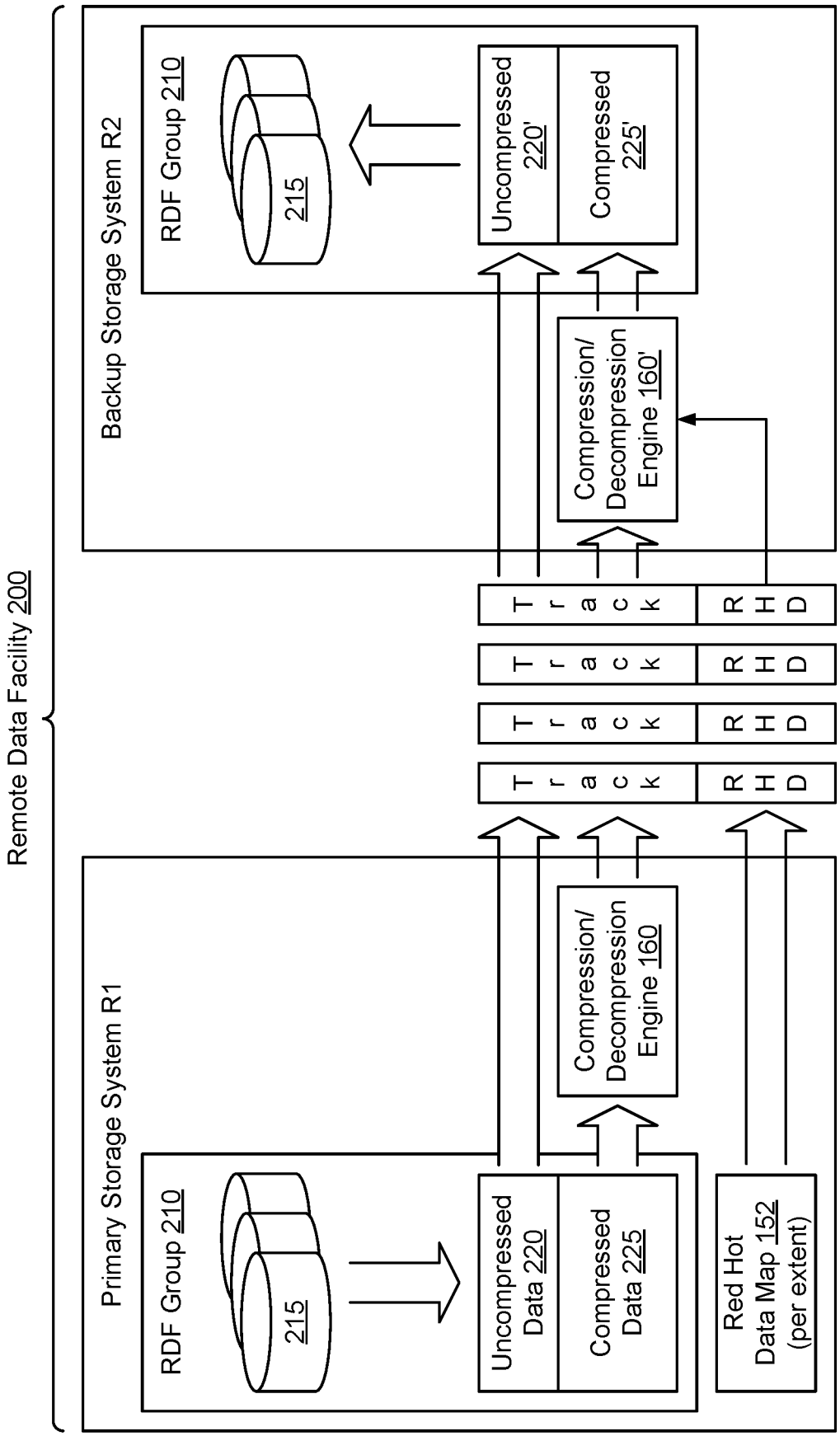
FIG. 2 is a functional block diagram of a remote data facility having a primary storage system R1 and a backup storage system R2, and showing operation of the storage systems during an initial synchronization phase of establishing the remote data facility, according to some embodiments.

FIG. 2 is a functional block diagram of a remote data facility having a primary storage system R1 and a backup storage system R2, and showing operation of the storage systems during an initial synchronization phase of establishing the remote data facility, according to some embodiments.

In the example remote data facility 200, a single primary storage system R1 (R1) is associated with a single backup storage system R2 using the following configuration: R1→R2. Other more complicated remote data facilities 200 might involve mirroring data from a primary storage system R1 to multiple backup storage systems R2, or a chained/cascaded topology in which a primary storage system is connected to a second storage system, which is in-turn connected to a third storage system using the following configuration: R1→R2|R1→R2, in which the second storage system acts as both an R2 and a R1 node to forward data from the primary storage system R1 to the third storage system on the remote data facility. Embodiments described herein can be used in connection with any selected RDF topology, and are not limited to implementation in the RDF topology shown in FIG. 2, which is shown merely as an example.

Storage systems maintain storage volumes for use by applications executing on host computers. A given host application 104 may use multiple storage volumes to store different types of data on the storage system 100. For example, a host application 104 may use a first storage volume 215 to store information associated with a database, and a second storage volume 215 to store logs identifying changes that have been made to the database. To enable the host application 104 to be restarted on the backup storage system R2, all of the storage volumes 215 required by the host application 104 should be protected by a given remote data facility 210.

As used herein, the term "RDF group" 210 is used to refer to a set of storage volumes 215 that are associated with a particular remote data facility 200. In the example remote data facility 200 shown in FIG. 2, the RDF group 210 includes a set of one or more thin storage volumes 215 which contain data that is to be mirrored from the primary storage system R1 to the backup storage system R2 on the remote data facility 200. As noted above, a remote data facility 200 involves track-level data transfer from the primary storage system R1 to the backup storage system R2 over a Fiber Channel connection, IP connection, or other connection between the storage systems 100. A given remote data facility 200 replicates each track of data contained within each of the storage volumes 215 of a given RDF group 210, and only one RDF group 210 will be replicated on any given remote data facility 200. Thus, there is a one-to-one matching between RDF group 210 on the primary storage system R1, and the remote data facility 200 that is used to mirror data contained in the storage volumes 215 of the RDF group 210 to the backup storage system R2.

When a remote data facility 200 is initially created, the primary storage system R1 will perform an initial synchronization of all tracks of data associated with the storage volumes 215 of the RDF group 210 to the backup storage system R2. During this initial synchronization phase, if some of the data that is to be transmitted is stored in compressed form on the primary storage system R1, the primary storage system R1 will uncompress that data prior to transmitting the data to the backup storage system R2. Since compression is typically implemented using a hardware-based compression/decompression engine 160, and because the two storage systems (R1, R2) might have different compression/decompression engines 160, it is preferable to uncompress the data at the primary storage system R1 before forwarding the tracks of data on the remote data facility 200.

When the data arrives at the backup storage system R2, conventionally the backup storage system R2 would compress all of the data that it received during the initial synchronization phase. At a subsequent time, once all the data had been synchronized on the remote data facility, the primary storage system R1 would transmit a copy of its red-hot data map 152 to the backup storage system R2. Upon receipt of the red-hot data map 152, the backup storage system R2 would uncompress any tracks associated with extents that were marked as hot in the red-hot data map 152, to synchronize the manner in which extents of data are stored on the backup storage system with the manner in which the extents of data are stored on the primary storage system.

Requiring the backup storage system R2 to compress all data during the initial synchronization phase, and then uncompress a large portion of the data upon receipt of the initial red-hot data map 152 puts enhanced strain on the CPU and compression/decompression engine of the backup storage system R2. For example, if the primary storage system R1 maintains 20% of the data of the RDF group in uncompressed form, after the initial synchronization phase the backup storage system R2 will need to uncompress 20% of the data that it just compressed. This needlessly requires the backup storage system R2 to compress and then uncompress 20% of the data being protected by the remote data facility.

According to some embodiments, a red-hot data indicator is added to each track of data written from the primary storage system R1 to the backup storage system R2. The red-hot data indicator indicates to the backup storage system R2, on a track-by-track basis, whether the data associated with that track should be stored by the backup storage system in uncompressed form or compressed form.

When the remote data forwarding application 156 submits a request to the front-end adapter 126 to retrieve a track of data, the front-end adapter will retrieve the track and store the track in a cache slot of shared global memory 138. In connection with this, if the track is compressed, the front-end adapter will cause the track to be passed through the compression/decompression engine 160 prior to being stored in the cache slot. Accordingly, the remote data forwarding application 156 does not have visibility as to whether a particular track was previous stored in uncompressed form or compressed form.

In some embodiments, the red-hot data indicator is determined by the remote data forwarding application 156 on the primary storage system R1 by determining which extent the track belongs to, and using the extent identifier to determine, from the red-hot data map 152, whether the track is associated with red-hot data or not. The remote data forwarding application 156 then appends a red-hot data (RHD) indicator to each track as that track is forwarded on the remote data facility 200.

During the initial synchronization phase, when the backup storage system R2 receives a track on the remote data facility 200, it reads the red-hot data indicator associated with the track. If the red-hot data indicator indicates that the track should remain uncompressed, the backup storage system R2 does not compress the track and stores the track in storage resources in as uncompressed data 220'. If the red-hot data indicator indicates that the track should be compressed, the backup storage system R2 checks to see if it previously had the track marked as uncompressed. If the backup storage system R2 did not previously have the track marked as uncompressed, the backup storage system R2 passes the track to a compression/decompression engine 160' and stores the track in storage resources as compressed data 225'. If the backup storage system R2 previously had the track marked as uncompressed, the backup storage system R2 does not compress the track to prevent thrashing.

The red-hot data map 152 may change frequently, however the primary storage system R1 may wait a period of time before moving an extent between compressed and uncompressed storage pools to prevent extents from constantly moving between storage pools 220, 225. Thus, there may be some differences on the primary storage system R1 between which extents are marked hot in the red-hot data map 152 and which extents are stored as uncompressed data on the storage system R1. Accordingly, by basing the red-hot data indicators on the red-hot data map, the remote data forwarding application 156 might cause some tracks to be compressed on the backup storage system R2 that are actually uncompressed on the primary storage system R1, and likewise may cause some tracks to be uncompressed on the backup storage system R2 that are actually compressed on the primary storage system R1. However, using the red-hot data map 152 to specify which tracks should be compressed enables the backup storage system R2 to divide tracks of data into uncompressed and compressed storage pools 220', 225' that would be expected to closely approximate the uncompressed and compressed storage pools 220, 225 of the primary storage system.

Figure 3:
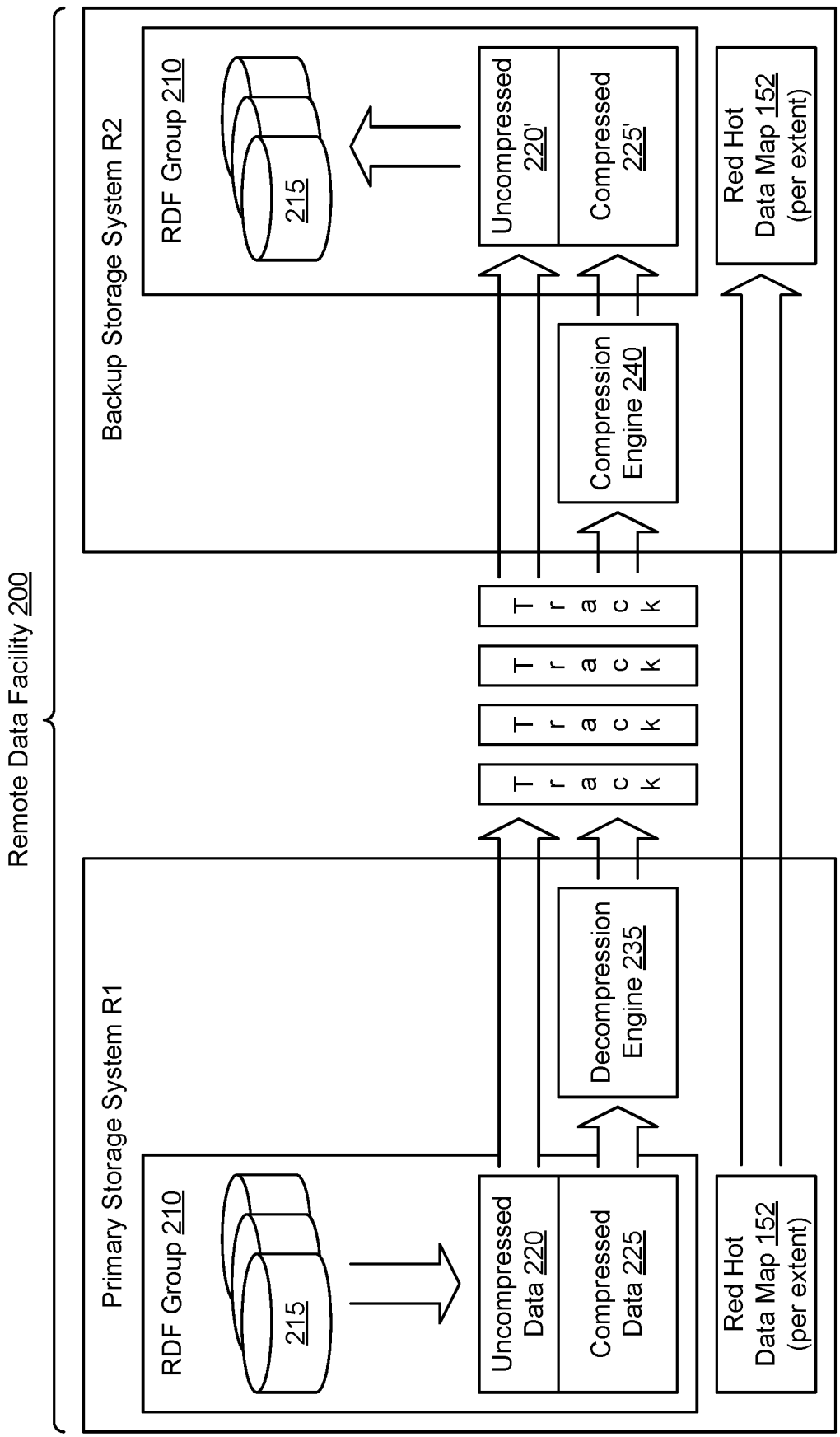
FIG. 3 is a functional block diagram of a remote data facility having a primary storage system R1 and a backup storage system R2, and showing operation of the storage systems after completion of the initial synchronization phase, according to some embodiments.

After the initial synchronization process has completed, the primary and backup storage systems exit the initial synchronization state and enter a data maintenance state. FIG. 3 is a functional block diagram of a remote data facility having a primary storage system R1 and a backup storage system R2, and showing operation of the storage systems after completion of the initial synchronization phase, according to some embodiments.

During the data maintenance state, the primary storage system R1 transmits changes to the extents as they occur and periodically transmits its red-hot data map 152 to the backup storage system R2. The red-hot data map 152 indicates, on an extent-by-extent basis, which extents of data should be stored in compressed form on the backup storage system R2. Upon receipt of the initial red-hot data map 152, the backup storage system will use the initial red-hot data map 152 to move extents of data between compressed and uncompressed storage, as necessary, to synchronize the manner in which extents of data are stored on the backup storage system R2 with the manner in which the extents of data are stored on the primary storage system R1.

Instructing the backup storage system R2 to selectively compress or not compress tracks of data during the initial synchronization phase greatly reduces the amount of CPU and compression/decompression engine resources required upon receipt of the initial red-hot data map 152. Specifically, by reading the red-hot data indicators, the backup storage system R2 can identify which tracks should be compressed and which tracks should not be compressed, and act accordingly. Since the red-hot storage indicators are based on the primary storage system's red-hot data map 152 as it existed during the initial synchronization phase, when the backup storage system R2 receives the initial red-hot data map 152 during the maintenance phase, it will only need to implement incremental changes associated with changes to the primary storage system's red-hot data map. Thus, adding red-hot data indicators to the tracks as they are transmitted during the initial synchronization stage enables the backup storage system R2 to expend significantly less CPU and compression/decompression engine resources, to achieve full synchronization with the primary storage system after completion of the primary synchronization phase. Whereas previously the backup storage system R2 would compress all data received during the initial synchronization phase, and then decompress 20% of the data to achieve compliance, using the techniques described herein the backup storage system can achieve much closer approximation of which tracks should be compressed and which should not be compressed. This results in much less expenditure of CPU and compression/decompression engine resources by the backup storage system R2 when the initial red-hot data map is received on the remote data facility.

Figure 4:
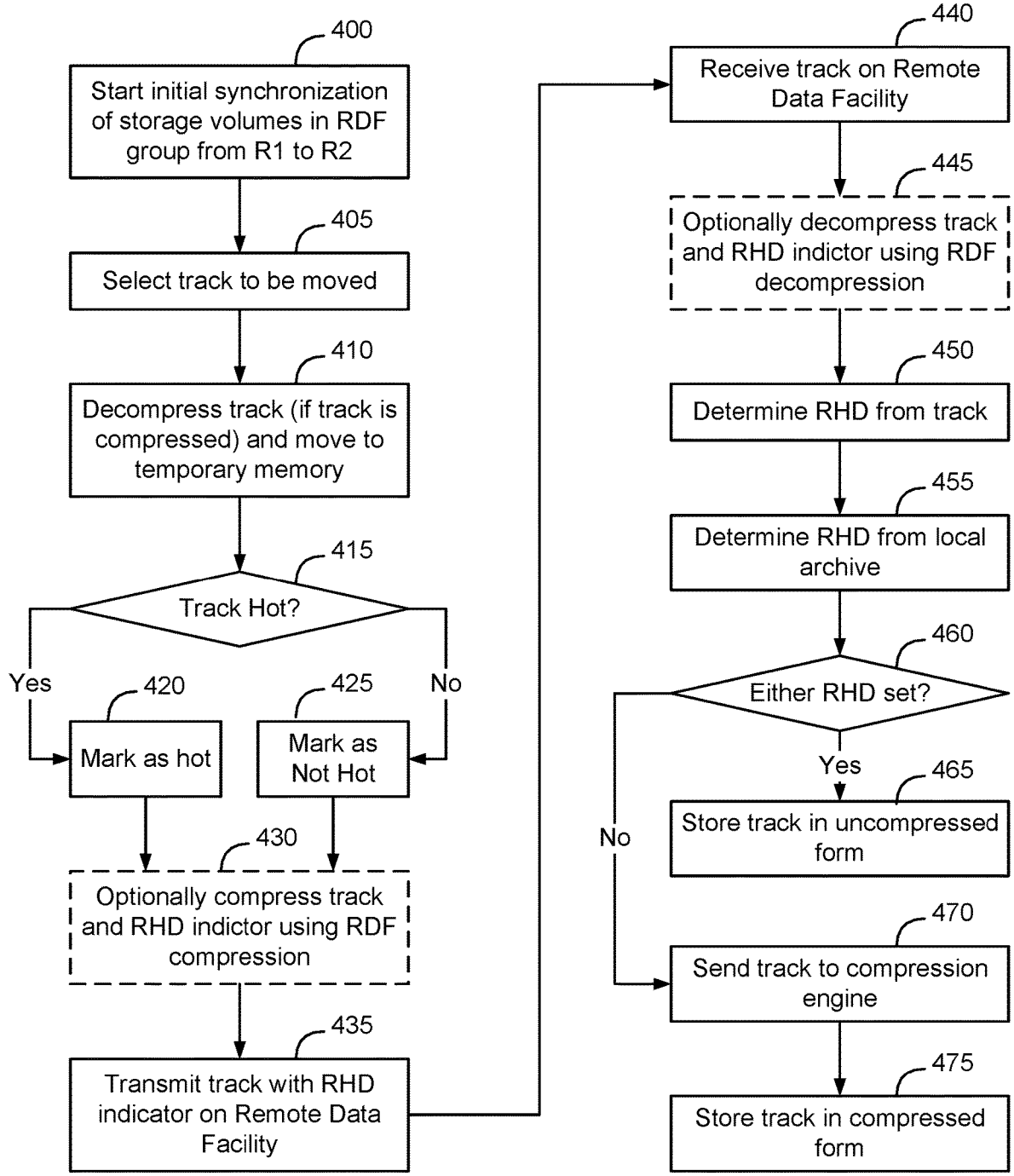
FIG. 4 is a flow chart of an example method of selective compression of data during initial synchronization of mirrored storage resources, according to some embodiments.

FIG. 4 is a flow chart of an example method of selective compression of data during initial synchronization of mirrored storage resources, according to some embodiments. Initial synchronization of storage resources can occur when a new remote data facility 200 is created for an RDF group. Another scenario which may involve the initial synchronization of data between primary and backup storage systems can occur when a new storage volume 215 is added to an existing RDF group.

In either instance, the remote data forwarding application 156 on the primary storage system R1 will start the initial synchronization of storage volumes 215 in the RDF group 210 from the primary storage system R1 to the backup storage system R2 (block 400). In some embodiments, this is done on a track-by-track basis. To do this, the remote data forwarding application selects a track to move (block 405) and submits a request to the front-end adapter 126 to retrieve the track. In connection with retrieving the track, the front-end adapter will decompress the track, if the track is compressed, and cause a copy of the track to be placed in a slot of shared memory 138 (block 410).

The remote data forwarding application 156 then determines if the track is hot (block 415). If the track is associated with a hot extent (a determination of YES at block 415) the track is marked as hot (block 420). If the track is not associated with a hot extent (a determination of NO at block 415) the track is marked as not hot (block 425). In some embodiments, the determination made at block 415 is implementing by reading the red-hot data map 152 to determine whether the track belongs to an extent that has been marked as hot or not hot on the primary storage system R1.

The primary storage system R1 then transmits the track with the red-hot data indicator (block 435) over a communication network where it is received by the backup storage system R2 (block 440).

Optionally, depending on the implementation of the remote data facility 200, the primary storage system R1 and backup storage system R2 may agree to use a separate remote data forwarding compression process in connection with transmission of data over the communication network. For example, to conserve bandwidth on the communication network, the primary storage system R1 may compress the track prior to transmitting it on the communication network (block 430) and the backup storage system R2 will then decompress the track upon receipt (block 435). Blocks 430 and 445 are shown in dashed lines because transmission compression is optional and will depend on the implementation of the remote data facility 200.

When a track is received by the backup storage system R2 (block 440) or after decompression of the track (block 445), the remote data forwarding application on the backup storage system R2 will read the red-hot data indicator (block 450). In some embodiments, the remote data forwarding application 156 on the backup storage system R2 will also have a local indication of which tracks of data have previously been identified as hot. In this instance, the remote data forwarding application 156 on the backup storage system R2 will also read a local red-hot data indicator for the track (block 455). If either the red-hot data indicator that was transmitted with the track, or the local red-hot data indicator for the track indicate that the track is associated with hot data (a determination of YES at block 460), the remote data forwarding application on the backup storage system R2 will cause the track to be stored in the uncompressed data pool 220' (block 465). If neither the red-hot data indicator that was transmitted with the track, nor the local red-hot data indicator for the track, indicate that the track is associated with hot data (a determination of NO at block 460), the remote data forwarding application 156 on the backup storage system R2 will send the track to the compression/decompression engine 160' (block 470) and store the track in the compressed data pool 225' (block 475).

The process shown in blocks 405 to 475 iterates for all tracks of all storage volumes 215 of the RDF group 210 during the initial synchronization process when the remote data facility 200 is first created between a pair of storage systems. After the primary storage system R1 has synchronized all tracks of each of the storage volumes 215 in the RDF group 210 to the backup storage system R2, the remote data forwarding applications 156 on the primary storage system R1 and backup storage system R2 will exit the initial synchronization state. After the initial synchronization stage has completed, the remote data forwarding application on the primary storage system R1 will periodically transmit its red-hot data map 152 and transmit changes to the remote data group 210, but no longer adds a red-hot data indicator to the tracks as they are transmitted on the remote data facility 200. Specifically, the remote data forwarding application will transmit tracks of data that have changed without appending a red-hot data indicator to the tracks. Since the backup storage system R2 has a copy of the red-hot data map 152, the backup storage system R2 can make compression determinations on tracks received during normal mirroring operations (outside of initial synchronization) in a normal manner.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing a method of selective compression of data during initial synchronization of mirrored storage resources, the computer program including a set of instructions which, when executed by a computer, cause the computer to perform a method comprising the steps of:
    creating a remote data facility between a primary storage system and a backup storage system, the remote data facility being configured to enable a storage volume of a remote data forwarding group to be mirrored from the primary storage system to the backup storage system on a track-by-track basis;
    entering into an initial synchronization state, by a remote data forwarding application on the primary storage system, the initial synchronization state being a state in which the remote data forwarding application initially transmits each of the tracks of the storage volume of the remote data forwarding group to the backup storage system over the remote data facility;
    for each track, determining by the remote data forwarding application, whether the track is associated with a respective extent that is experiencing high input/output activity on the primary storage system; and
    appending a respective red-hot data indicator to each track, the respective red-hot data indicator indicating to the backup storage system whether the track should be compressed or not compressed upon receipt on the remote data facility.

2. The non-transitory tangible computer readable storage medium of claim 1, wherein the remote data forwarding group contains multiple storage volumes, and wherein during the initial synchronization state the remote data forwarding application initially transmits each of the tracks of each of the storage volumes of the remote data forwarding group to the backup storage system over the remote data facility.

3. The non-transitory tangible computer readable storage medium of claim 2, wherein the steps of determining whether the track is associated with a respective extent that is experiencing high input/output activity on the primary storage system, and appending the red-hot data indicator to each track, is implemented by the remote data forwarding application on each track of each of the storage volumes of the remote data forwarding group.

4. The non-transitory tangible computer readable storage medium of claim 1, further comprising maintaining a red-hot data map by the primary storage system, on a per-extent basis, identifying which extents of the storage volume are experiencing high input/output activity.

5. The non-transitory tangible computer readable storage medium of claim 4, further comprising not transmitting the red-hot data map during the initial synchronization state.

6. The non-transitory tangible computer readable storage medium of claim 4, wherein the step of determining whether the track is associated with a respective extent that is experiencing high input/output activity on the primary storage system comprises reading a value of the respective extent in the red-hot data map by the remote data forwarding application.

7. The non-transitory tangible computer readable storage medium of claim 4, further comprising:
    completing transmission of all of the tracks of the storage volume to the backup storage system over the remote data facility;
    exiting the initial synchronization state; and
    transmitting the red-hot data map from the primary storage system to the backup storage system.

8. The non-transitory tangible computer readable storage medium of claim 7, further comprising:
    after exiting the initial synchronization state, determining changes to the storage volume;
    transmitting tracks associated with changes to the storage volume on the remote data facility; and
    not appending red-hot data indicators to the tracks transmitted on the remote data facility after exiting the initial synchronization state.

9. The non-transitory tangible computer readable storage medium of claim 1, further comprising:
    receiving, by the backup storage system, the tracks of data transmitted during the initial synchronization state;
    reading the red-hot data indicator of each received track; and
    using the red-hot data indicator to selectively cause a first portion of the received tracks to be compressed and stored in compressed form and a second portion of the received tracks to be stored in uncompressed form on the backup storage system.

10. The non-transitory tangible computer readable storage medium of claim 9, wherein if the red-hot data indicator indicates that a particular track is associated with a respective extent that is experiencing high input/output activity on the primary storage system, the particular track will be stored in uncompressed form on the backup storage system.

11. The non-transitory tangible computer readable storage medium of claim 1, further comprising:
    receiving, by the backup storage system, the tracks of data transmitted during the initial synchronization state;
    reading the red-hot data indicator of each received track;
    reading a local red-hot data indicator of each received track; and using the red-hot data indicator and local red-hot data indicator to selectively cause a first portion of the received tracks to be compressed and stored in compressed form and a second portion of the received tracks to be stored in uncompressed form on the backup storage system.

12. The non-transitory tangible computer readable storage medium of claim 11, wherein if either the red-hot data indicator or local red-hot data indicator indicates that a particular track is likely to be associated with a respective extent that is experiencing high input/output activity on the primary storage system, the particular track will be stored in uncompressed form on the backup storage system.

13. A method of selective compression of data during initial synchronization of mirrored storage resources, comprising:
creating a remote data facility between a primary storage system and a backup storage system, the remote data facility being configured to enable a group of storage volumes of a remote data forwarding group to be mirrored from the primary storage system to the backup storage system on a track-by-track basis;
entering into an initial synchronization state, by a remote data forwarding application on the primary storage system, the initial synchronization state being a state in which the remote data forwarding application initially transmits each of the tracks of each storage volume of the group of storage volumes of the remote data forwarding group to the backup storage system over the remote data facility;
for each track, determining by the remote data forwarding application, whether the track is associated with a respective extent that is experiencing high input/output activity on the primary storage system; and
appending a respective red-hot data indicator to each track, the respective red-hot data indicator indicating to the backup storage system whether the track should be compressed or not compressed upon receipt on the remote data facility.

14. The method of claim 13, further comprising maintaining a red-hot data map by the primary storage system, on a per-extent basis, identifying which extents of the storage volume are experiencing high input/output activity;
wherein each extent is associated with a plurality of respective tracks.

15. The method of claim 14, further comprising not transmitting the red-hot data map during the initial synchronization state.

16. The method of claim 14, wherein the step of determining whether the track is associated with a respective extent that is experiencing high input/output activity on the primary storage system comprises reading a value of the respective extent in the red-hot data map by the remote data forwarding application.

17. The method of claim 14, further comprising:
completing transmission of all of the tracks of the storage volumes to the backup storage system over the remote data facility;
exiting the initial synchronization state; and
transmitting the red-hot data map from the primary storage system to the backup storage system.

18. The method of claim 17, further comprising:
after exiting the initial synchronization state, determining changes to the storage volumes;
transmitting tracks associated with changes to the storage volumes on the remote data facility; and
not appending red-hot data indicators to the tracks transmitted on the remote data facility after exiting the initial synchronization state.

19. The method of claim 13, further comprising:
receiving, by the backup storage system, the tracks of data transmitted during the initial synchronization state;
reading the red-hot data indicator of each received track; and
using the red-hot data indicator to selectively cause a first portion of the received tracks to be compressed and stored in compressed form and a second portion of the received tracks to be stored in uncompressed form on the backup storage system;
wherein if the red-hot data indicator indicates that a particular track is associated with a respective extent that is experiencing high input/output activity on the primary storage system, the particular track will be stored in uncompressed form on the backup storage system.

20. The method of claim 13, further comprising:
receiving, by the backup storage system, the tracks of data transmitted during the initial synchronization state;
reading the red-hot data indicator of each received track;
reading a local red-hot data indicator of each received track; and
using the red-hot data indicator and local red-hot data indicator to selectively cause a first portion of the received tracks to be compressed and stored in compressed form and a second portion of the received tracks to be stored in uncompressed form on the backup storage system;
wherein if either the red-hot data indicator or local red-hot data indicator indicates that a particular track is likely to be associated with a respective extent that is experiencing high input/output activity on the primary storage system, the particular track will be stored in uncompressed form on the backup storage system.

* * * * *